United States Patent
Baskaran

(10) Patent No.: US 8,909,925 B2
(45) Date of Patent: Dec. 9, 2014

(54) SYSTEM TO SECURE ELECTRONIC CONTENT, ENFORCE USAGE POLICIES AND PROVIDE CONFIGURABLE FUNCTIONALITIES

(75) Inventor: Prakash Baskaran, Bangalore (IN)

(73) Assignee: Prakash Baskaran, Ashbuurn ( * ) Notice: Subject to any disclaimer, the term of this patent is extended or adjusted under 35 U.S.C. 154(b) by 1128 days.

(21) Appl. No.: 12/708,537

(22) Filed: Feb. 19, 2010

(65) Prior Publication Data

US 2010/0146269 A1 Jun. 10, 2010

(30) Foreign Application Priority Data

Nov. 17, 2008 (IN) .......................... 2826/CHE/2008
Jan. 4, 2010 (IN) .............................. 16/CHE/2010

(51) Int. Cl.
*H04L 29/06* (2006.01)
*G06F 21/10* (2013.01)

(52) U.S. Cl.
CPC .............. *H04L 63/102* (2013.01); *G06F 21/10* (2013.01); *G06F 2221/2101* (2013.01); *G06F 2221/2141* (2013.01); *H04L 63/08* (2013.01); *G06F 2221/0775* (2013.01)
USPC ................... 713/165; 726/26; 726/27; 726/28

(58) Field of Classification Search
CPC ....... H04L 63/102; H04L 63/08; G06F 21/10; G06F 2221/0775; G06F 2221/2141; G06F 2221/2101
USPC .................................. 713/165; 726/27, 26, 28
See application file for complete search history.

(56) References Cited

U.S. PATENT DOCUMENTS

| | | | |
|---|---|---|---|
| 6,920,567 B1 | 7/2005 | Doherty et al. | |
| 6,959,290 B2 | 10/2005 | Stefik et al. | |
| 7,299,502 B2 | 11/2007 | Schmeling et al. | |
| 2004/0064713 A1 | 4/2004 | Yadav | |
| 2005/0262568 A1 | 11/2005 | Hansen et al. | |
| 2007/0150299 A1 | 6/2007 | Flory | |
| 2007/0157287 A1 | 7/2007 | Lim | |
| 2007/0211901 A1* | 9/2007 | Isozaki et al. | 380/237 |
| 2008/0066148 A1 | 3/2008 | Lim | |
| 2008/0066150 A1 | 3/2008 | Lim | |
| 2009/0048978 A1* | 2/2009 | Ginter et al. | 705/51 |
| 2009/0132805 A1 | 5/2009 | Ginter et al. | |

* cited by examiner

Primary Examiner — Kambiz Zand
Assistant Examiner — Ayoub Alata
(74) Attorney, Agent, or Firm — Barry Choobin; Patent360 LLC

(57) ABSTRACT

A computer implemented method and system for managing electronic content security and access within a networked environment are provided. A proprietary wrapper file is created for encapsulating the electronic content upon transferring the electronic content to the computing device of a user. The proprietary wrapper file is configured for enforcing content usage policies on the electronic content and for performing configurable functionalities. A security client application is provided on the computing device in response to a request for accessing the electronic content. A local software component employed for accessing the electronic content is embedded within the security client application. The user is granted controlled access to the electronic content by enforcing the content usage policies through the wrapper file. The activities of the user on the electronic content are monitored and tracked by the security client application to ensure compliance of the activities with the enforced content usage policies.

29 Claims, 11 Drawing Sheets

| SIGNATURE | GATEWAY HEADER |
|---|---|
| FILE ICONS ||
| OPEN DATA ||
| SECURE RECORD BLOCKS (1-N) ||
| CONTENT/FILE DATA ||
| TAR PIT DATA ||

FIG. 6

CURRENT PAWAAWEB POLICY

POLICY SUMMARY

| | |
|---|---|
| POLICY NAME | : IRM BLOCK POLICY |
| LOCK SAVE (EDIT) | : YES |
| BLOCK SAVE AS | : YES |
| BLOCK PRINT | : YES |
| BLOCK CLIPBOARD | : YES |
| BLOCK CAPTURING SCREEN SHOTS | : YES |
| OPEN FILE WITHIN GROUP MEMBERS | : YES |
| OPEN FILE OUTSIDE GROUP MEMBERS | : YES |
| OPEN FILE WITHIN NETWORK | : YES |
| OPEN FILE OUTSIDE NETWORK | : YES |
| EXPIRE AFTER | : 0 DAYS |
| EXPIRE AFTER | : 0 UNSUCCESSFUL ATTEMPTS |
| SESSION EXPIRE AFTER | : 0 MINUTES |

FIG. 10

SYSTEM TO SECURE ELECTRONIC CONTENT, ENFORCE USAGE POLICIES AND PROVIDE CONFIGURABLE FUNCTIONALITIES

CROSS REFERENCE TO RELATED APPLICATIONS

This application claims the benefit of the following patent applications:
1. Non-provisional patent application Ser. No. 16/CHE/2010 titled "System To Secure Electronic Content, Enforce Usage Policies And Provide Configurable Functionalities", filed on Jan. 4, 2010 in the Indian Patent Office.
2. Non-provisional patent application Ser. No. 2826/CHE/2008 titled "Activity Monitoring and Information Protection", filed on Nov. 17, 2008 in the Indian Patent Office.
3. Non-provisional patent application Ser. No. 12/352,604 titled "Activity Monitoring and Information Protection", filed on Jan. 12, 2009 in the United States Patent and Trademark Office.

The specifications of the above referenced patent applications are incorporated herein by reference in their entirety.

BACKGROUND

Information rights management (IRM) is critical for any enterprise seeking to protect sensitive information and knowledge assets from unauthorized access. Current IRM technologies offer several levels of security, for example, providing standardized encryption of content, governing usage of content in accordance with corporate policies, and enabling a fair amount of usage tracking within the enterprise network environment. Existing IRMs also monitor and restrict incoming and outgoing communications to and from the enterprise network. This secures distribution of sensitive information within the enterprise network from falling into unauthorized recipients. However, the information shared with authorized users in a primary distribution list, for example, internal employees and trusted business partners may often be misused. For example, the authorized users may frequently edit and distribute the information to recipients who are not part of the primary distribution list, such as, secondary vendors. In other instances, the authorized users may indiscreetly distribute the information without being aware of the level of confidentiality that the information requires. This provides an avenue for inadvertent information leaks and results in potential information thefts. Also, once the information leaves the boundaries of the enterprise network environment due to such information leaks, the IRM loses control over the information flow and usage.

Furthermore, most of the current IRM solutions provide a default set of rights-management specifications for protecting sensitive information from unauthorized persons, and are not adaptive to cater to different user positions and access levels based on an enterprise's hierarchy. Moreover, the current IRM solutions are limited to enforcing default access and usage restrictions, but lack extensibility for incorporating functions that augment information security and consumption, because the IRM features are stored within the information itself, for example, within the document file itself.

Hence, there has been a long felt but unresolved need for a computer implemented method and system for management of information security and access that governs content usage across the enterprise network environment, prevents information misuse outside the enterprise network environment, and provides extensibility for custom functions related to information security and consumption.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for managing information security and access by governing content usage across the enterprise network environment, preventing information misuse outside the enterprise network environment, and providing extensibility for custom functions related to information security and consumption. Since the electronic content is often distributed in the form of documents and files, the computer implemented method and system disclosed herein manages electronic file security and access within a networked environment. A proprietary wrapper file is created for encapsulating the electronic content in response to a request for transferring the electronic content, for example, from one or more predefined enterprise file servers to a computing device. A portable utility, for example, a wrapper file manipulation engine creates the proprietary wrapper file for encapsulating the electronic content in an encrypted format. The proprietary wrapper file carries a proprietary and uniform file extension regardless and independent of the native file format of the electronic content or the internet media type (MIME type) of the electronic content. The proprietary wrapper file is configured for enforcing content usage policies on the electronic content and for performing various configurable functionalities. The content usage policies, among multiple other records, are stored within the proprietary wrapper file, for example, in the file header of the wrapper file. In an embodiment, the content usage policy is pre-established and populated in the file header of the wrapper file during content transfer. In another embodiment, the content usage policy is assembled on the fly and populated in the file header of the wrapper file during content transfer. The proprietary wrapper file encapsulates the electronic content, the file header, the content usage policies, etc. in an encrypted format.

In response to a request to access the electronic content on the computing device, the user is prompted to download a security client application on the computing device from a predefined network location or the policy server using, for example, a universal resource locator (URL). The security client application is installed on the computing device for creating a secured and controlled computing and networking environment. A local software component preloaded on the computing device and employed for accessing the networked environment is embedded within the security client application. The user is then granted controlled access to the electronic content by enforcing the content usage policies through the proprietary wrapper file. The activities of the user on the electronic content are monitored and tracked by the security client application to ensure compliance of the activities with the enforced content usage policies.

In an embodiment for managing content security, a security client application is provided on a computing device of a user in response to a request for accessing the electronic content within the networked environment. A local software component employed for accessing the electronic content is embedded within the security client application. The local software component is preloaded on the computing device of the user.

Upon transferring the electronic content to the computing device, a proprietary wrapper file is created by the wrapper file manipulation engine or the security client application for encapsulating the electronic content. The electronic content is encapsulated within the proprietary wrapper file regardless of the native file format of the electronic file, but based on the confidentiality level assigned to the electronic content. In an embodiment, the security client application is also configured to create the proprietary wrapper file. The electronic content need not pre-exist in the form of an electronic file on a file system in order to encapsulate the electronic file. For example, the security client application can detect dynamically generated web content on the local software component, for example, on a web browser, and encapsulate and save this web content as a proprietary wrapper file on the computing device. The proprietary wrapper file is configured for enforcing content usage policies on the electronic content and for performing a plurality of configurable functionalities. The user is granted controlled access to the electronic content by enforcing the content usage policies through the proprietary wrapper file. The activities of the user on the electronic content are monitored and tracked by the security client application to ensure compliance of the activities with the enforced content usage policies.

The security client application restricts the user from performing predefined activities on the electronic content on detection of violation of the enforced content usage policies. The electronic content is encapsulated within the proprietary wrapper file and encrypted upon transferring the electronic content to the computing device. The format of the propriety wrapper file is a proprietary and standardized file security format. The format of the proprietary wrapper file implies or indicates encryption of the electronic content encapsulated within the proprietary wrapper file. The proprietary wrapper file comprises a uniform file extension independent of the file type, the file format, and file extension of the encapsulated electronic content. The proprietary wrapper file is also assigned a customized file identifier, for example, a customized file icon that identifies the source or creator or owner of the electronic content. Furthermore, the format of the propriety wrapper file is content-type agnostic, i.e., the proprietary wrapper file can encapsulate any electronic content irrespective of the type of the electronic content. In other words, future electronic content types are amenable to protection by the encapsulation format of the proprietary wrapper file.

The proprietary wrapper file conditions the access to the electronic content by requiring the user to explicitly authenticate using user credentials or implicitly authenticate by allowing the security client application to contact the policy server through pre-stored user information. After authenticating the user as required by the content usage policy, the encapsulated electronic content is extracted and decrypted for granting controlled access to the electronic content encapsulated within the proprietary wrapper file. The proprietary wrapper file launches a pre-designated native application to grant access to the electronic content according to the content usage policy. The content usage policy, for example, the IRM policies are enforced in an application-neutral manner, such that the content usage policy is enforced irrespective of the native application launched for opening the extracted electronic content. In an embodiment, the proprietary wrapper file restricts usage of the electronic content within the networked environment by determining whether security client application can reach the policy server when the user attempts to access the electronic content. In another embodiment, the proprietary wrapper file supports an autonomous off-line access mode, where the proprietary wrapper file is created for off-line access of the encapsulated electronic content, and is used in the absence of connectivity to the policy server or its gateway. The proprietary wrapper file is also configured for password protected off-line access of the encapsulated electronic content.

The proprietary wrapper file comprises multiple records pertaining to content usage polices, the electronic content, type and format of the electronic content, identification and addressing of the policy server and the online resources, etc. In addition to policy enforcement, the wrapper file along with a wrapper file manipulation engine provides additional configurable functionalities through its adapter design or architecture. In an embodiment, the proprietary wrapper file is configured to synchronize or automatically update the encapsulated electronic content with the original copy, or the source copy of the electronic content as prescribed by the content usage policy. The proprietary wrapper file is also configured to augment custom functionality into the electronic content, in addition to the normal functions performed by a native application. The proprietary wrapper file is configured to execute embedded files and applications, wherein the files and applications are embedded in the encapsulated electronic content. In an embodiment, the proprietary wrapper file can launch external applications on the computing device and/or the networked environment for executing the embedded files and applications.

The proprietary wrapper file provides IRM aspects, time aspects, location aspects, and environment control aspects in managing the electronic content security. Access to the electronic file is controlled based on predefined IRM policies, data loss prevention (DLP) policies, distribution lists, and location and environment restrictions.

Also disclosed herein is a method of creating a proprietary wrapper file for encapsulating the electronic content in a networked environment. A wrapper file manipulation engine is invoked in response to a user action to trigger encapsulation of the electronic content within a proprietary wrapper file. The proprietary wrapper file comprises a predefined file structure. In response to the wrapper file manipulation engine being invoked, the content usage policy and encryption information are obtained from a policy server based on the user information in the security client application. Metadata associated with one or more configurable functionalities is generated by invoking one or more adapters associated with the configurable functionalities. The electronic content, the user information, the usage policy, the encryption information, and the generated metadata are encapsulated and selectively encrypted in the predefined file structure of the proprietary wrapper file. The user action that triggers encapsulation of the electronic content is, for example, an explicit request to encapsulate the electronic content stored on the computing device of the user. In another example, the user action that triggers encapsulation of the electronic content is a request to transfer the electronic content to a computing device of the user from the networked environment, for example, a resource on the network.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 6 exemplarily illustrates a file structure of the proprietary wrapper file.

FIG. 10 exemplarily illustrates a screenshot enumerating the content usage policies associated with the electronic content.

DETAILED DESCRIPTION OF THE INVENTION

Figure 1:
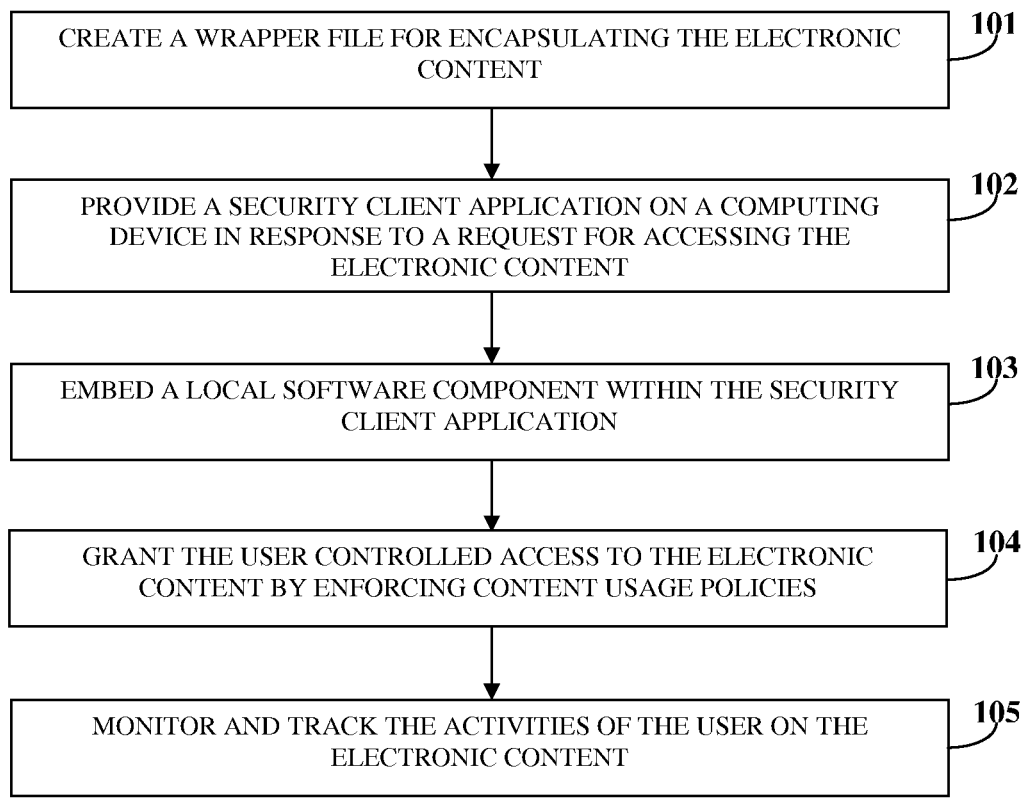
FIG. 1 illustrates a computer implemented method of managing security of and access to electronic content in a networked environment.

FIG. 1 illustrates a computer implemented method of managing security of and access to electronic content in a networked environment. The networked environment is, for example, the internet, a corporate intranet, or an enterprise network extendable by a virtual private network (VPN). The electronic content may be stored in one or more online resources, for example, a corporate database, a remote computer, or a web server, and accessed via a database server, a file server, a data loss prevention (DLP) server, etc. The electronic content also comprises dynamically generated web content, such as, a dynamic web page, and may not pre-exist on a file system of a database. A proprietary wrapper file is created 101 for encapsulating the electronic content in response to a request for transferring the electronic content, for example, from one or more predefined enterprise file servers to the computing device. A portable utility that directly executes on the computing device 202, for example, a wrapper file manipulation engine creates the proprietary wrapper file on the fly for encapsulating the electronic content in an encrypted format. The electronic content is encapsulated within the proprietary wrapper file, herein referred to as the "wrapper file", regardless of the native file format of the electronic content, but based on the confidentiality level preassigned to the electronic content. As used herein, "encapsulation" refers to the process of combining raw electronic content and metadata in a predefined format with applicable layers of encryption that results in the proprietary wrapper file. The wrapper file carries a proprietary and uniform file extension regardless of and independent of the native file format of the electronic content, or the internet media type (MIME type) of the electronic content. The proprietary wrapper file is configured for enforcing content usage policies on the electronic content and for performing or invoking various configurable functionalities. The content usage policies, among other records, are assembled and stored within the wrapper file, for example, in the file header of the wrapper file. In addition to the content usage policies, the file header may include one or more encryption/decryption keys for multi-level encryption and decryption of the electronic content, a location identifier for addressing the online resource, for example, an IP address, a location identifier for addressing the policy server, the original MIME type of the content, etc. A default set of content usage policies are established by the originator of the electronic content, or an administrator of the policy server associated with online resources. Additionally, tailor made policies specific to a user or a group of users are established on the policy server by the administrator.

In response to a request to access the electronic content on the computing device, the user is prompted to download a security client application on the computing device from a predefined network location or the policy server using, for example, a universal resource locator (URL). The security client application is installed 102 on the computing device for creating a secured and controlled computing and networking environment. A local software component preloaded on the computing device and employed for accessing the networked environment is embedded 103 within the security client application. The user's computing device is, for example, a personal computer, a laptop, a personal digital assistant, a mobile device enabled with internet capabilities, etc.

The local software component is preloaded on the computing device of the user. The local software component may be preconfigured to connect to specific online resources, for example, remote corporate computers. The security client application forms a software wrapper around the local software component. Inbound and outbound communications of the local software component are monitored by the security client application. The security client application is able to embed more than one local software component as well as more than one instance of a single local software component. The local software component may be any software component that accesses information via a network. As used herein, the term "software component" refers to a system element offering a predefined service or event, and which can communicate with other components. The local software component may, for example, be a web browser, a virtual private network (VPN) client, an electronic mail (email) client, a database administrator tool, a database client application, etc., or any software component that accesses information via a network, for example, the internet or an intranet, or on a desktop computer, and functions in a client server model. The local software component may be a stand-alone software application or a software element typically running in context of another software application, for example, an ActiveX™ control, a Java™ applet, a Flash™ object, etc.

The user is then granted 104 controlled access to the electronic content by enforcing the content usage policies by the security client application through the wrapper file. The activities of the user on the electronic content are monitored and tracked 105 by the security client application to ensure compliance of the activities with the enforced content usage policies. The wrapper file encapsulates the electronic content, the file headers, and the policies, among other records in an encrypted format. For example, the wrapper file encapsulates the electronic content in a multi-layer encrypted format along with metadata that describes the electronic content, the enforceable content usage policy information, and the configurable functionalities. In addition to policy enforcement, the wrapper file along with a wrapper file manipulation engine provides value added features or functionalities through its plug-in architecture. This plug-in architecture allows adapters to be implemented and registered with the wrapper file manipulation engine that invokes these adapters to provide intended configurable functionalities, as described in greater detail with reference to FIGS. 8A and 8B.

The format of the wrapper file is a proprietary and standardized content security format. The format of the wrapper file implies or indicates encryption of the electronic content encapsulated within the wrapper file. The wrapper file is also assigned a customized file identifier, for example, a customized file icon that identifies the source or creator or owner of the electronic content. The wrapper file supports icons that are independent of the file extension and the native application of the electronic content, and are assigned based on the origin of the electronic content or the original MIME type of the electronic content. The customized file icon assigned to the wrapper file is, for example, a corporate logo, a trademark, a trade symbol, etc. Furthermore, the format of the proprietary wrapper file is content-type agnostic, i.e., the proprietary wrapper file can encapsulate any electronic content irrespective of the type of the electronic content. In other words, future electronic content types are amenable to protection by the encapsulation format of the proprietary wrapper file.

The wrapper file provides IRM aspects, time aspects, location aspects, and environment control aspects in managing the electronic content security. Access to the electronic content is controlled based on predefined IRM policies, DLP policies, distribution lists, and location and environment restrictions. For example, the wrapper file ensures that only intended users can open the electronic content at intended locations, and only when the content usage policy is enforced. The intended users of the electronic content are based on a distribution list maintained by the policy server and populated in the header records of the wrapper file. Also, the wrapper file controls the environment aspects by, for example, screening the resident and network applications that can be launched during content access and usage as per the content usage policy.

The user can transfer and access the electronic content in different access modes, namely, an explicit authentication mode, an implicit authentication mode, and an off-line mode. The proprietary wrapper file controls the access to the electronic content by requiring the user to explicitly authenticate using user credentials or implicitly authenticate by allowing the security client application to contact the policy server through pre-stored user information. In the former case, the wrapper file authenticates the user by prompting the user to enter the user credentials, for example, a combination of a username and a password, a digital signature, a personal security certificate, etc. The credentials are validated by the wrapper file manipulation engine against the user information stored in the file header of the wrapper file or at policy server. In the explicit authentication mode, the user is authenticated at the policy server during all times of content transfer and content usage. In an embodiment, the user can transfer the electronic content without authenticating at the policy server. However, the user has to authenticate locally on the computing device using a pre-negotiated username and password or authenticate remotely at the policy server before obtaining access to the encapsulated electronic content. User authentication is required since access to the electronic content is limited to pre-designated users in a distribution list maintained in the file header and/or at the policy server.

In another embodiment requiring a connection to the network, the credentials are validated by the policy server. The policy server is operationally equivalent to, for example, a DLP server. The policy server may further contact an external authentication server, for example, an active directory (AD) or a lightweight directory access protocol (LDAP) server for the authentication. The policy server may employ single sign on functionality that allows the user to access multiple systems and information associated with the enterprise network with a single log in. In another embodiment, the wrapper file supports autonomous off-line access and off-line password protected access modes that enables the user to access the electronic content when the computing device is operating in an off-line mode. In the off-line password protected access mode, the user can obtain access to the encapsulated electronic content if the user is one among the users in the distribution list stored in the file header records of the wrapper file. The access to the electronic content is governed by the content usage policies stored in the file header. Depending on a particular access mode, the file header of the wrapper file is populated with records that govern usage of the electronic content in that access mode. For example, in the explicit authentication mode, the file header is populated with a gateway encryption key that leads to a secondary encryption key for multi-level encryption/decryption of the electronic content.

After the user is authenticated, the wrapper file is decapsulated for granting controlled access to the electronic content encapsulated within the wrapper file. As used herein, "decapsulation" refers to the process of arriving at the raw electronic content and metadata after decryption and disassembly of the wrapper file. The proprietary wrapper file launches a pre-designated native application to grant access to the electronic content according to the content usage policy. The proprietary wrapper file restricts usage of the electronic content within the networked environment by determining whether security client application can contact the policy server when the user attempts to access the electronic content. For example, the wrapper file encapsulating the electronic content may prompt the user to connect to the network and optionally authenticate the user credentials with the policy server.

Controlled access to the electronic content allows restricted usage or full usage of the electronic content based on the current content usage policies. For example, a user may be permitted to edit the electronic content, create duplicate copies of the electronic content, print the electronic content, take a screenshot of the content, etc, based on the content usage policy. Based on another set of content usage policies for another electronic content, a user may be prohibited from distributing the electronic content, performing copy and paste operations on the electronic content using a clipboard facility, transferring the electronic content to an external storage media, etc. Furthermore, the security client application restricts the user from performing predefined activities on the electronic content on detection of violations of the enforced content usage policies. For example, the security client application may erase the electronic content after a number of unsuccessful authentication attempts by the user.

The content usage policy may comprise a predefined list of actions or a subset of the actions permitted on the electronic content. In a multiple user environment, each of the users' content usage policy is tailor made based on a user group that the user belongs to as configured in the policy server. For example, in a corporate environment, the content usage policy for each of the users may be determined by the policy server based on the position of the user in the corporate environment, job profile of the user, etc. In an embodiment, the content usage policy is populated in the file header of the wrapper file on the fly during content transfer, based on a user profile of the user transferring the electronic content.

The local software component accesses the online resources via the security client application. In an embodiment, the local software component may transfer electronic content from the online resources of the corporate network without the security client application being installed on the computing device, as explained in more detail with reference to FIG. 1. The transferred electronic content is encapsulated within the wrapper file and encrypted using standardized encryption key. However, the user is prompted to download and install the security client application from the policy server at a secured IP address or website in order to access the electronic content, for example, open the electronic content. Once the security client application is installed on the computing device, all the user activities on the electronic content are tracked, and all the information accessed thereafter is monitored and controlled by the security client application. In an embodiment, the online resources may be configured to communicate only via the security client application. In case of multiple online resources, a proxy server may be used to ensure that the online resources communicate only via the security client application, the details of which are described in the co-pending U.S. application Ser. No. 12/352,604, which is hereby incorporated herein by reference.

The activities performed by the user with the electronic content are tracked using the security client application. The activities are monitored against the content usage policy and may be recorded for future reference with detailed forensic information. The security client application creates or updates an activity log at predetermined intervals of time. The activity log is transferred to the logging database at regular intervals when the computing device is connected to the network. Tracking the activities may comprise capturing and recording user inputs, for example, mouse clicks and keyboard inputs, number of unsuccessful authentication attempts, editing operations on the electronic content, copy and paste operations on the electronic content, "save as" operations, print commands, etc. Electronic transfers of the electronic content, for example, by facsimile (fax) or electronic mail, may also be tracked or prohibited based on the content usage policy.

The security client application transfers the activity log of the tracked activities to the policy server at predefined intervals of time for future use. As used herein, the term "activity log" refers to a chronological log of tracked information created by the security client application on the computing device. The activity log may, for example, comprise forensic information, associated screenshots, logs of tracked activities, and other user data that may be utilized by an administrator of the policy server during review and report generation. The predefined intervals of time at which the transfer occurs may be defined in the content usage policy or another set of policy. The activity log is, for example, used for determining violations of the content usage policy by the user, maintaining a record of corporate resource usage, etc. Violations of the content usage policy may comprise attempts on activities or operations prohibited by the content usage policy, such as, copy and paste operations on the content on the electronic content, transferring the electronic content to an external storage media, a number of unsuccessful authentication attempts, attempts to print or electronically transmit the electronic content, etc. The activity log may also be used by an administrator of the policy server to modify the content usage policy based on usage.

The file header of the wrapper file contains or is populated with multiple records, including different versions of the content usage policies associated with the electronic content, different revisions of the electronic content, etc. among other records. In an embodiment, the security client application may periodically query the policy server, using the location identifier stored in the header records, for updates or changes to the content usage policies associated with the stored electronic content. The wrapper file is then configured to apply the latest set of policies for content usage. Also, the wrapper file is configured to automatically re-encrypt the electronic content using a newly published encryption key on the policy server. In an embodiment, the wrapper file stores all the previous versions of the encryption key in the header records and can revert to the original encryption key at any time.

In an embodiment, the wrapper file may be configured to synchronize or automatically update the encapsulated electronic content with the original copy or the source copy of the electronic content, when the source copy is updated at the online resource location. The wrapper file retrieves the source copy by locating the online resource using the location identifier for the online resource stored in the file header. In another embodiment, the wrapper file updates the encapsulated electronic content on-demand and performs version control of the electronic content in view of the updates. The wrapper file may also retrieve and store all the revisions of the electronic content with timestamps, revision numbers, and user identifiers in its records, and can revert to any revision of the electronic content based on user command.

In an embodiment, the wrapper file can augment custom and configurable functionalities into the electronic content, in addition to the normal functions performed by a native application on the electronic content. For example, the wrapper file comprises one or more add on controls and plug-ins that can run or execute embedded files and embedded applications in the encapsulated electronic content. Alternatively, the wrapper file is configured to launch external applications on the computing device or on the network for executing embedded files and applications in the encapsulated electronic content.

The native application that runs the electronic content may be terminated by the user. Also, the user may create new copies of the electronic content using the native application. In either case, the wrapper file manipulation engine triggers the re-encryption of the electronic content or the encryption of new copies of the electronic content created by the native application or component. The copy of the electronic content is encapsulated by another wrapper file, which replicates the policy information, the encryption/decryption key, and the other records of the file header, and hence enforces the same set of content usage policies on the copy of the electronic content. Also, even when the user changes the file extension of the electronic content, the wrapper file maintains the original MIME type of the electronic content in its header records.

Figure 2:
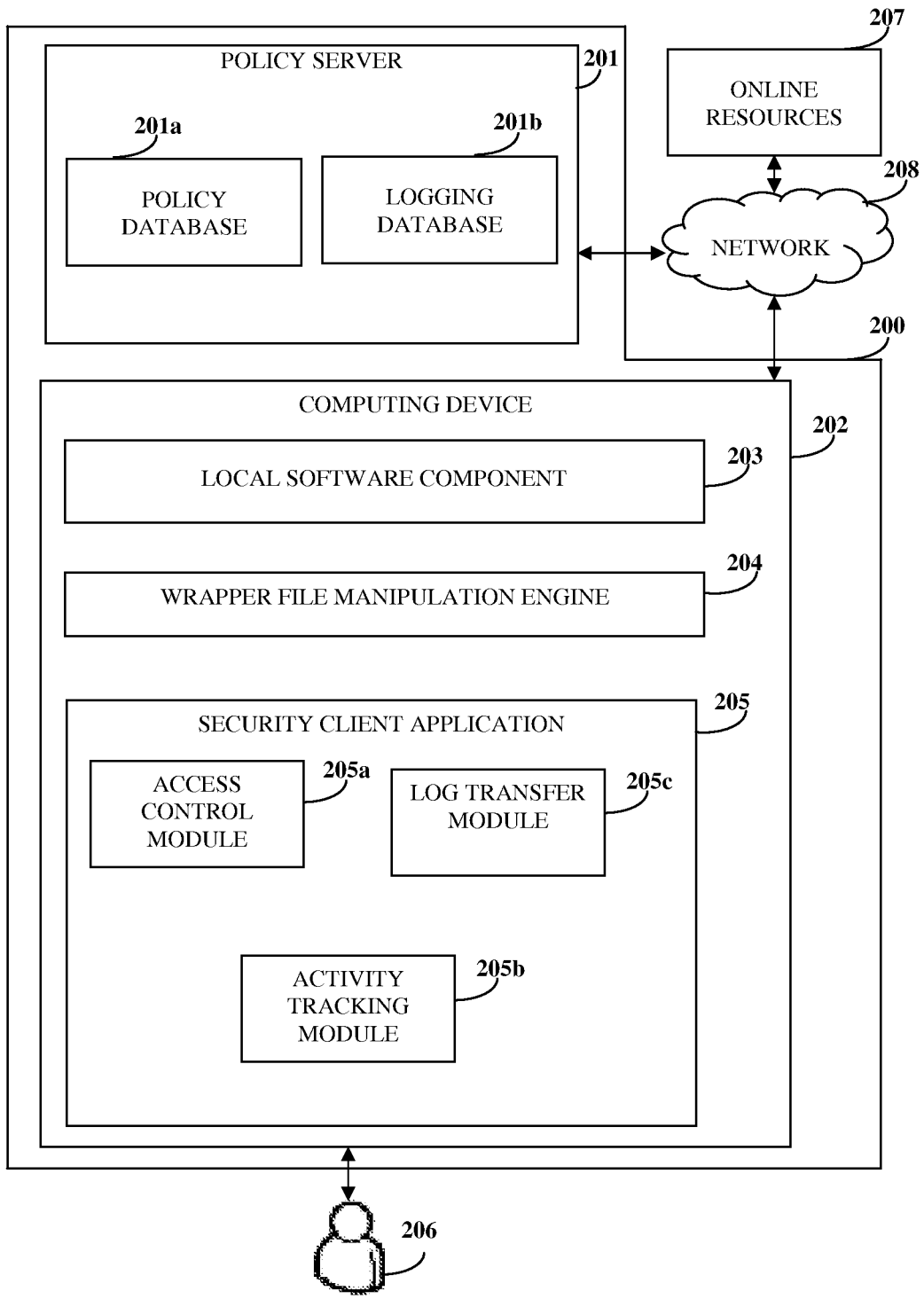
FIG. 2 illustrates a computer implemented system for managing security of and access to electronic content in a networked environment.

FIG. 2 illustrates a computer implemented system 200 for managing security of electronic content in a networked environment, comprising a policy server 201 and a computing device 202 of a user 206 connected to a network 208. A plurality of online resources 207 associated with an enterprise network is accessible to the computing device 202 via the network 208. The policy server 201 provides a security client application 205 on the computing device 202 of the user 206 in response to a request for accessing electronic content within the networked environment. The electronic content on the online resources 207 associated with an enterprise comprise compendia, such as, best practices, business secrets, technical specifications, knowledge assets, dynamically generated web content, dynamic web page, etc. The computing device 202 comprises a wrapper file manipulation engine 204, the security client application 205, and one or more local software components 203.

The wrapper file manipulation engine 204 encapsulates the electronic content within a wrapper file upon transferring the electronic content to the computing device 202. The wrapper file manipulation engine 204 also encrypts the electronic content using standardized encryption algorithms, or proprietary encryption algorithms. The wrapper file manipulation engine 204 is the primary executable application that is capable of encapsulating and decapsulating electronic content in wrapper files. The wrapper file manipulation engine 204 uses the decryption key stored in the file header of the wrapper file or in the policy server 201 for decryption. The wrapper file is configured for enforcing content usage policies on the electronic content and for performing one or more configurable functionalities. The content usage policies are stored within file header of the wrapper file. In an embodiment, tailor made content usage policies are stored in the header file of the wrapper file on the fly during content transfer. Multiple wrapper file adapters are distributed over the networked environment and generate metadata associated with the configurable functionalities. The metadata being encapsulated along with the electronic content within the proprietary wrapper file are generated when the wrapper file manipulation engine 204 invokes one or more of the wrapper file adapters.

The security client application 205 embeds a local software component 203 within the security client application 205, and can detect content transfer activities on the software component. The security client application 205 comprises an access control module 205a, an activity tracking module 205b, and a log transfer module 205c. The access control module 205a grants the user 206 controlled access to the electronic content by enforcing the content usage policies through the proprietary wrapper file. The access control module 205a permits the user 206 to perform activities allowed for the user 206 based on the list of activities enumerated in the content usage policies. The activity tracking module 205b monitors and tracks the activities of the user 206 on the electronic content to ensure compliance of the activities with the enforced content usage policies. The log transfer module 205c transfers the activity log from the computing device 202 to the policy server 201 at regular intervals.

The policy server 201 comprises a policy database 201a and a logging database 201b. The policy server 201 is operationally equivalent to, for example, a DLP server that monitors and controls enterprise data in use and data at rest. The policy server 201 including the various logical network configurations of an enterprise in relation with different network access technologies for the computing device 202 has been described in detail in co-pending U.S. application Ser. No. 12/352,604, which is hereby incorporated herein by reference. The policy server 201 may retrieve the content usage policy corresponding to the electronic content from the policy database 201a. When the content usage policy corresponding to the electronic content has to be updated, an administrator updates the content usage policy on the policy database 201a. The updated policy is periodically accessed by the security client application 205 and reflected in the file header of the wrapper file. The logging database 201b of the policy server 201 stores the transferred log of the user activities for administrator access.

Figure 3:
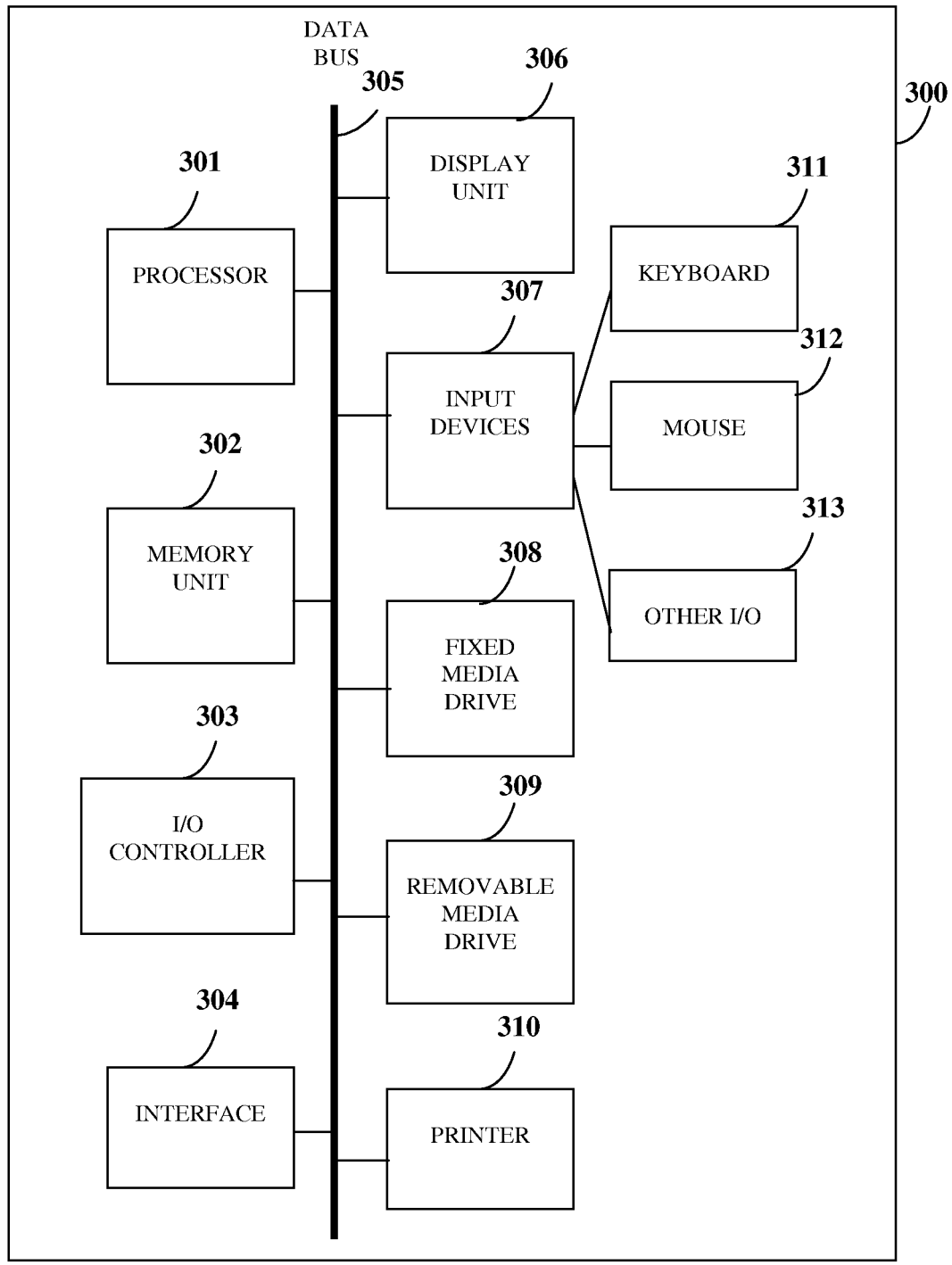
FIG. 3 exemplarily illustrates typical architecture of a computer system used for managing security of and access to electronic content in a networked environment.

FIG. 3 exemplarily illustrates typical architecture of a computer system 300 used for managing security of an electronic content in a networked environment. The computing device 202 and the policy server 201 employ the typical architecture of the computer system 300 illustrated in FIG. 3, or employ a subset or a superset of the architecture of FIG. 3.

The computing device 202 and the policy server 201 communicate with each other via the network 208. The network 208 is, for example, a wireless network, a wired network, a local area network (LAN), a wide area network (WAN), a cellular network, a satellite network, etc. The computer system 300 comprises, for example, a processor 301, a memory unit 302 for storing programs and data, an input/output (I/O) controller 303, a network interface 304, network bus 305, a display unit 306, input devices 307, a fixed media drive 308, a removable media drive 309, a printer 310, etc.

The processor 301 is an electronic circuit that can execute computer programs. The memory unit 302 is used for storing programs, applications, and data. For example, the security client application 205 is stored on the memory unit 302 of the computer system 300. The memory unit 302 is, for example, a random access memory (RAM) or another type of dynamic storage device that stores information and instructions for execution by processor 301. The memory unit 302 also stores temporary variables and other intermediate information used during execution of the instructions by the processor. The computer system 300 further comprises a read only memory (ROM) or another type of static storage device that stores static information and instructions for the processor 301. The network interface 304 enables connection of the computer system 300 to the network 208. The I/O controller 303 controls the input and output actions performed by the user 206. The data bus 305 permits communication between the modules, for example, 203, 204, 205, 205a, 205b, and 205c of the computer implemented system 200.

The display unit 306 displays results of the local software component 203 to the user 206. The input devices 307 are used for inputting data into the computer system 300. The input devices 307 are, for example, a keyboard 311 such as an alphanumeric keyboard, a joystick, a mouse 312, a touch pad, a light pen, or other I/O 313. The computer system 300 further comprises a fixed media drive 308 and a removable media drive 309 for receiving removable media.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly through the network 208. Computer applications and programs are executed by double clicking a related icon displayed on the display unit 306 using one of the input devices 307. The user 206 interacts with the computer system 300 using a graphical user interface (GUI) of the display unit 306.

The computer system 300 of the computing device 202 and the server employs operating systems for performing multiple tasks. An operating system is responsible for the management and coordination of activities and the sharing of the resources of the computer system 300. The operating system further manages security of the computer system 300, peripheral devices connected to the computer system 300, and network connections. The operating system employed on the computer system 300 recognizes, for example, inputs provided by the user 206 using one of the input devices 307, the output display, files and directories stored locally on the fixed media drive 308, etc. The operating system on the computer system 300 of the computing device 202 executes different programs initiated by the user 206 using the processor 301. Instructions for executing the security client application 205 are retrieved by the processor 301 from the program memory in the form of signals. Location of the instructions in the program memory is determined by a program counter (PC). The program counter stores a number that identifies the current position in the program of the security client application 205.

The instructions fetched by the processor 301 from the program memory after being processed are decoded. After processing and decoding, the processor 301 executes the instructions. For example, the wrapper file manipulation engine 204 defines the instructions for creating a wrapper file for encapsulating the electronic content. The security client application 205 defines the instructions for embedding a local software component 203 within the security client application 205. The access control module 205a defines the instructions for granting the user 206 controlled access to the electronic content by enforcing the content usage policies. The activity tracking module 205b defines the instructions for monitoring and tracking the activities of the user 206 on the electronic content to ensure compliance of the activities with the enforced content usage policies. The log transfer module 205c defines the instructions for transferring the activity log from the computing device 202 to the policy server 201 at regular intervals, etc., which are stored in the program memory or received from a remote server.

The processor 301 retrieves the instructions defined by the wrapper file manipulation engine 204, security client application 205, the access control module 205a, the activity tracking module 205b, and the log transfer module 205c, and executes the instructions.

Figure 4:
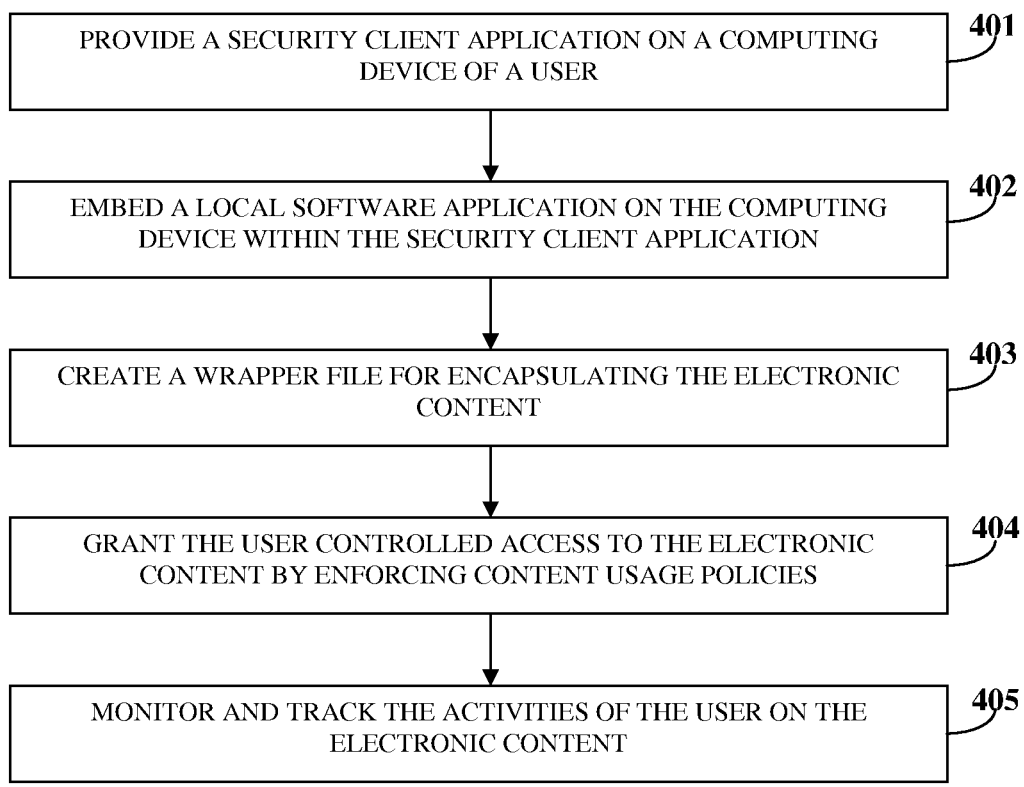
FIG. 4 exemplarily illustrates another embodiment of the computer implemented method for managing security of and access to electronic content in a networked environment.

FIG. 4 exemplarily illustrates another embodiment of the computer implemented method for managing security of electronic content in a networked environment. A security client application 205 is provided 401 on a computing device 202 of a user 206 in response to a request for accessing the electronic content within the networked environment. The security client application 205 is installed on the computing device 202 for creating a secured and controlled computing and networking environment on the computing device 202. A local software component employed for accessing the electronic content is embedded 402 within the security client application 205. The local software component is preloaded on the computing device 202 of the user 206. A proprietary wrapper file is created 403 by the wrapper file manipulation engine 204 on the fly for encapsulating the electronic content upon transferring the electronic content to the computing device 202. In an embodiment, the security client application 205 is also configured to create the proprietary wrapper file for encapsulating the electronic content. The electronic content need not pre-exist in the form of an electronic file on a file system in order to encapsulate the electronic file. For example, the security client application 205 can detect dynamically generated web content on the local software component 203, for example, on a web browser, and encapsulate and save this web content as a proprietary wrapper file on the computing device 202. The user 206 is then granted 404 controlled access to the electronic content by enforcing the content usage policies by the security client application 205 through the wrapper file. The security client application 205 may contact the policy server 201 via the local software component 203 to decrypt the electronic content on the computing device 202. The activities of the user 206 on the electronic content are monitored and tracked 405 by the security client application 205 to ensure compliance of the activities with the enforced content usage policies.

The file header of the wrapper file is populated with multiple records, including a header record designating the application with which the electronic content should open. In an embodiment, the wrapper file can force open the electronic content with a pre-designated native application instead of the default application for the MIME type of the electronic content. The wrapper file overrides the metadata stored in the file header of the electronic content pertaining to the designated native application with which the electronic content should originally open. The content usage policy, for example, the IRM policies are enforced in an application-neutral manner, such that the content usage policy is enforced irrespective of the native application launched for opening the decapsulated electronic content. The file header may also comprise header records that implement life cycle management, such that the wrapper file expires or locks itself based on usage time, making the electronic content encapsulated within the wrapper file inaccessible. For example, the wrapper file encapsulating the electronic content expires after a predetermined number of calendar days or after a predetermined number of attempts to access the electronic content.

Figure 5:
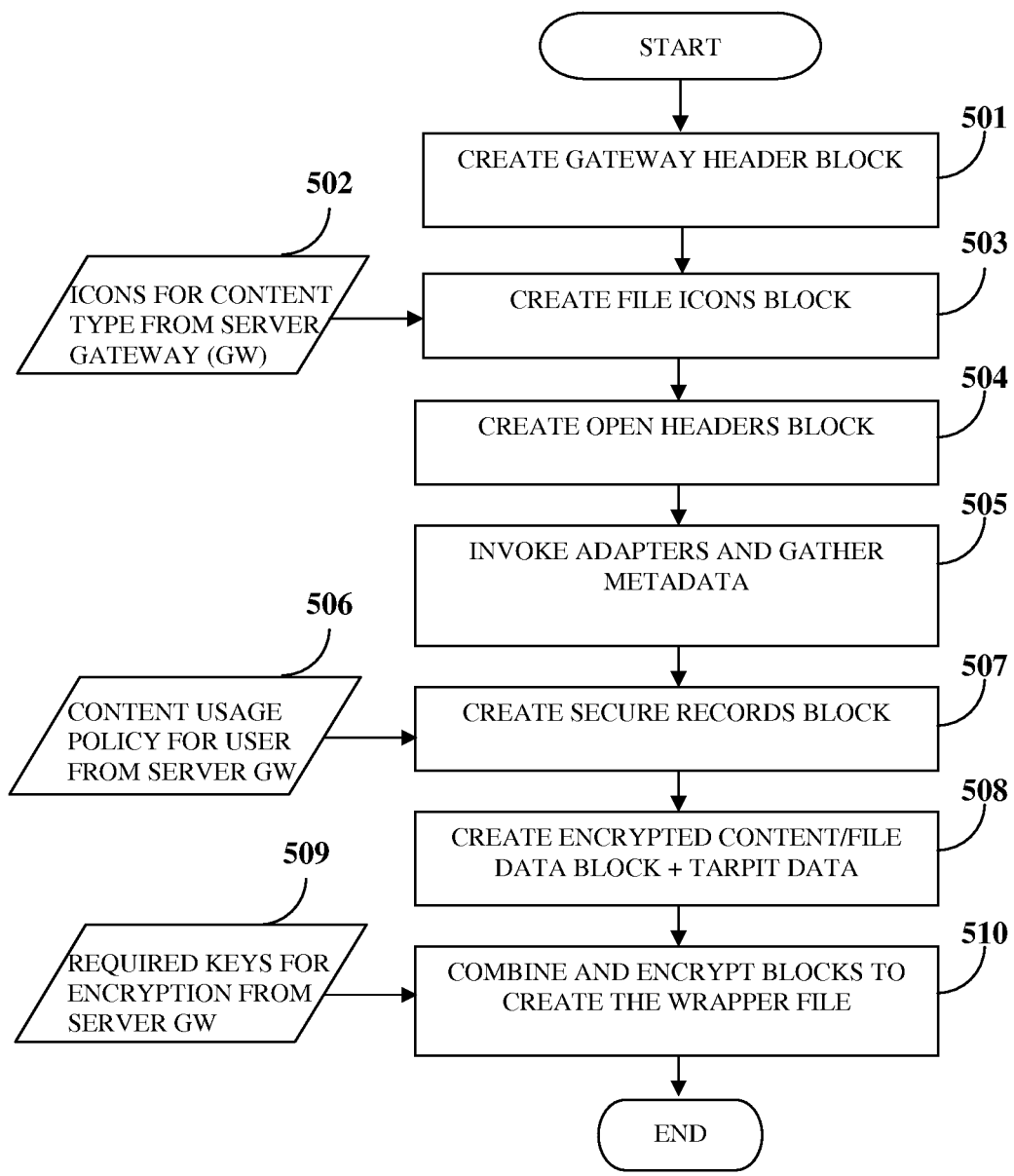
FIG. 5 exemplarily illustrates a flowchart for encapsulating the electronic content in an encrypted format.

FIG. 5 exemplarily illustrates a flowchart for encapsulating the electronic content in an encrypted format. The user 206 accesses the online resources 207 associated with an enterprise through a website, and takes a file creation action, for example, clicking an electronic file to download or export or save the electronic content to the computing device 202. If the electronic content exists in its native file format or transferred in the original MIME format, the policy server's gateway address associated with the electronic file is determined to create 501 the gateway header block. The icons associated with the electronic file are procured 502 from the server gateway, and an icons block is created 503 in the file header. An open headers record is created 504 in the header file if required. The wrapper file adapters associated with the desired functionalities are invoked 505 to gather the respective metadata. One or more secure record blocks are created 507 in the file header for the gathered metadata. The content usage policy associated with the electronic content, which applies to the user 206, is obtained 506 from the server gateway. The electronic content is encrypted 508 using the encryption key and tar pit data is appended to the encrypted content record to prevent illegitimate access to the electronic content by rendering the wrapper file tamper proof. The keys required for encryption are obtained 509 from the server gateway. The blocks, including the gateway header block, the open headers block, the secure record blocks, the content block, etc. are combined and selectively encrypted 510 to create the wrapper file, as illustrated in FIG. 6. FIG. 6 exemplarily illustrates a file structure of the wrapper file.

The wrapper file encapsulating the electronic content is thus saved to the memory of the computing device 202. The native file extension of the electronic content is changed at a file system level by applying the file extension of the wrapper file, for example, a ".paw extension" that encapsulates the electronic content. This indicates that the encapsulated electronic content is encoded or encrypted in the format of the wrapper file. A customized file icon is assigned to the wrapper file. The file icon, for example, a corporate logo, a trademark, a trade symbol, etc. identifies the source of the electronic content.

Figure 7:
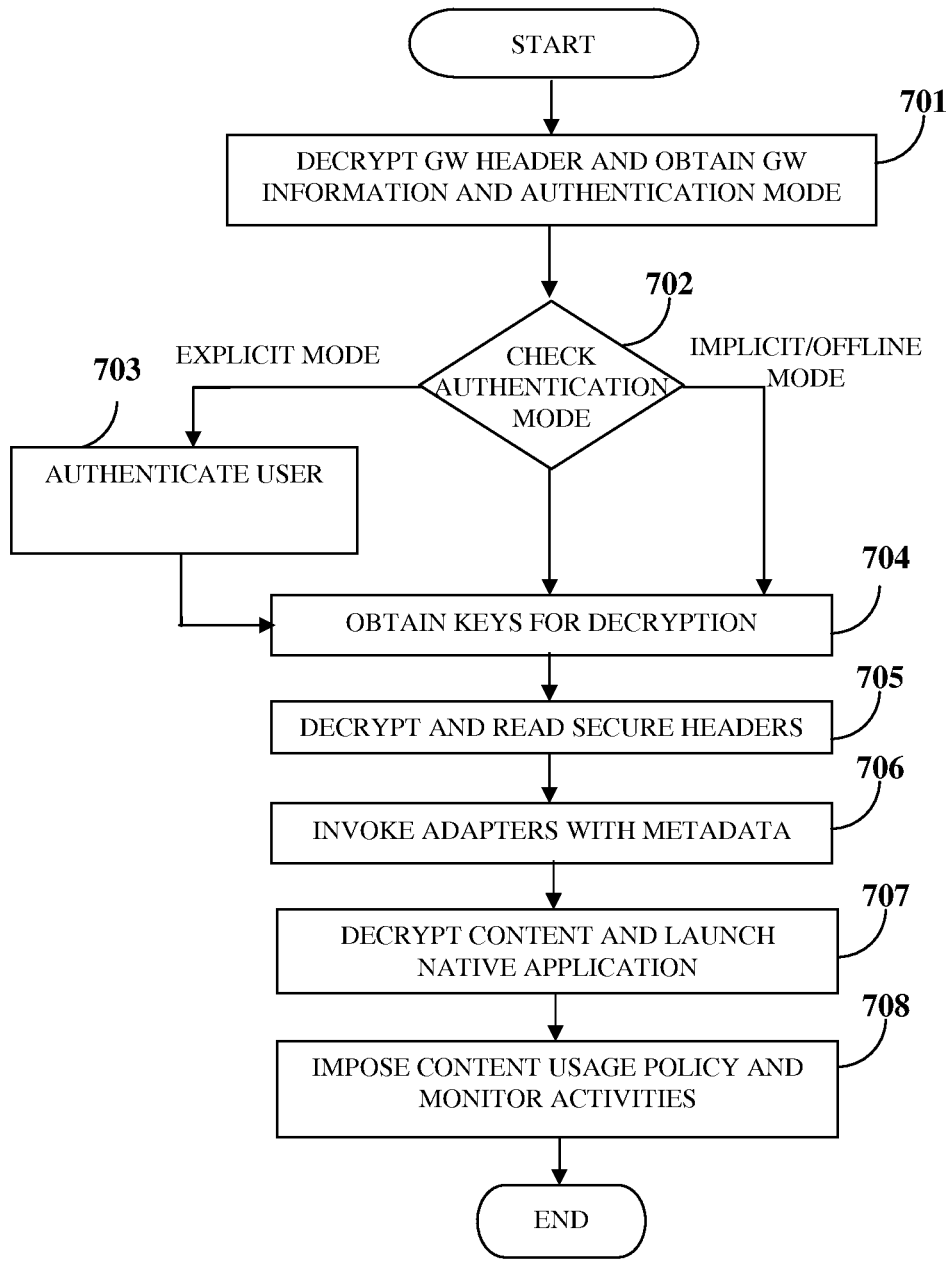
FIG. 7 exemplarily illustrates a flowchart for decrypting encapsulated electronic content.

FIG. 7 exemplarily illustrates a flowchart for decrypting the encapsulated electronic content. When the user 206 attempts to open the stored wrapper file, the gateway header record is decrypted 701 to obtain the information regarding the gateway and the access or authentication mode. The keys for decryption are obtained 704 based on the authentication mode 702, namely, an explicit authentication mode, an implicit authentication mode, or an off-line mode. The user 206 is authenticated 703 before contacting the policy server 201, if the user 206 is accessing the electronic content in the explicit authentication mode. The secure headers record is decrypted and read 705 for invoking 706 the wrapper file adapters with the respective metadata. The electronic content is decrypted 707 to provide access to the electronic content by launching the native application. The electronic content is forced to open with a specified application as pre-designated in the header records. The user 206 is allowed controlled access to the electronic content by imposing 708 the content usage policies and monitoring the activities of the user 206.

Figure 8A:
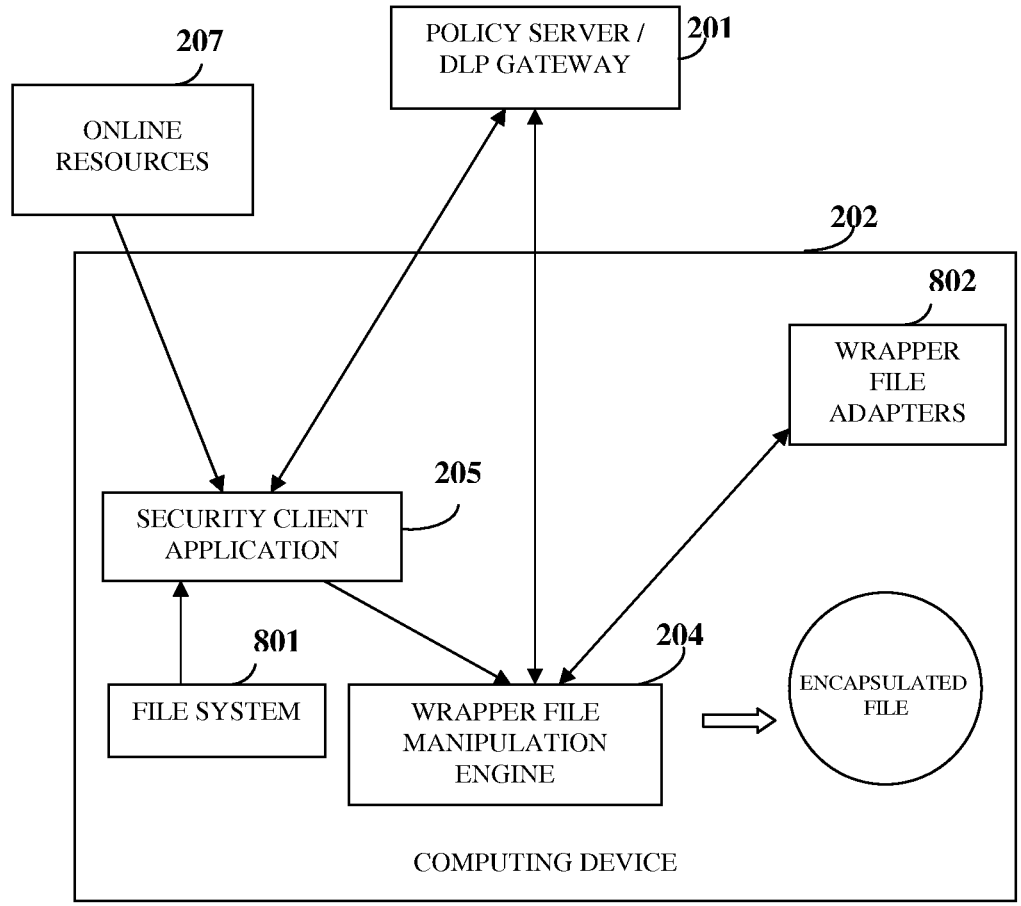
FIG. 8A exemplarily illustrates a logical architecture for creating a proprietary wrapper file.

FIG. 8A exemplarily illustrates a logical architecture for creating a proprietary wrapper file. A wrapper file manipulation engine 204 is invoked in response to a user action to trigger encapsulation of the electronic content within a proprietary wrapper file. The user action that triggers encapsulation of the electronic content is, for example, an explicit request to encapsulate the electronic content stored on the computing device 202 of the user 206. An "application Studio" is provided to allow a desktop user 206 to choose electronic files on the file system 801 and encapsulate them using wrapper files for protection and distribution. In another example, the user action that triggers encapsulation of the electronic content is a request to transfer the electronic content to a computing device 202 of the user 206 from the networked environment, for example, a network resource 207. In response to the wrapper file manipulation engine 204 being invoked, the content usage policy and the encryption information are obtained from a policy server 201 or DLP gateway, based on the user information in the security client application 205. Metadata associated with one or more configurable functionalities is generated by invoking one or more wrapper file adapters 802 associated with the configurable functionalities using standardized interfaces. The electronic content, the user information, the content usage policy, the encryption information, and the generated metadata are encapsulated and selectively encrypted in the predefined file structure of the proprietary wrapper file. In an embodiment, the configurable functionalities for the electronic content are selected based on different criteria, such as, the type of electronic content, the consumer of the electronic content, the originator of the electronic content, the relationship of the originator with the consumer, etc.

The wrapper file adapters 802 are plug-ins that can be implemented to provide additional functionalities through the wrapper file. The wrapper file adapters 802 are invoked by the wrapper file manipulation engine 204 during encapsulation and decapsulation of the wrapper files. The wrapper file adapters 802 to be invoked are pre-registered through a separate registration process and the wrapper file manipulation engine 204 maintains information to invoke specific adapters 802 for specific record types through its internal registry. During encapsulation, the wrapper file manipulation engine 204 invokes a registered adapter 802 for each supported record-type. The file wrapper manipulation engine 204 provides the context metadata that a wrapper file adapter 802 may use to generate a metadata record for a specific record-type. The metadata record generated by the wrapper file adapter 802 is accepted and encapsulated in, for example, the secure record blocks of the wrapper file. During decapsulation, the wrapper file manipulation engine 204 extracts the encapsulated metadata records and invokes the wrapper file adapters 802 with the respective metadata, such that the wrapper file adapters 802 fulfill their intended functions. In an embodiment, the wrapper file adapter 802 is either a simple adapter or a feedback adapter. When the wrapper file manipulation engine 204 calls a simple adapter, the simple adapter does not return any value. However, when the wrapper file manipulation engine 204 calls a feedback adapter, the feedback provided by the feedback adapter affects the flow of the wrapper file manipulation engine 204 during decapsulation.

The wrapper file adapters 802 are configured to generate metadata for specific functions. For example, a wrapper file adapter 802 generates metadata to be embedded within the wrapper file, and displays a relevant advertisement when invoked with the embedded metadata during the decapsulation of the wrapper file. In another example, a read-receipt-adapter generates metadata during encapsulation, and transmits a read-receipt, for example, via SMTP when the wrapper file is decapsulated and the electronic content opened in a native application. In another example, a pay-to-use adapter is invoked that can collect a fee for using the electronic content when the wrapper file is opened. Based on whether the user 206 has paid for accessing the electronic content, the pay-to-use adapter instructs the wrapper file manipulation engine 204 whether to allow access to the electronic content or block access to the electronic content. The pay-to-use adapter also allows the user 206 to make a payment for content usage through a credit card.

Figure 8B:
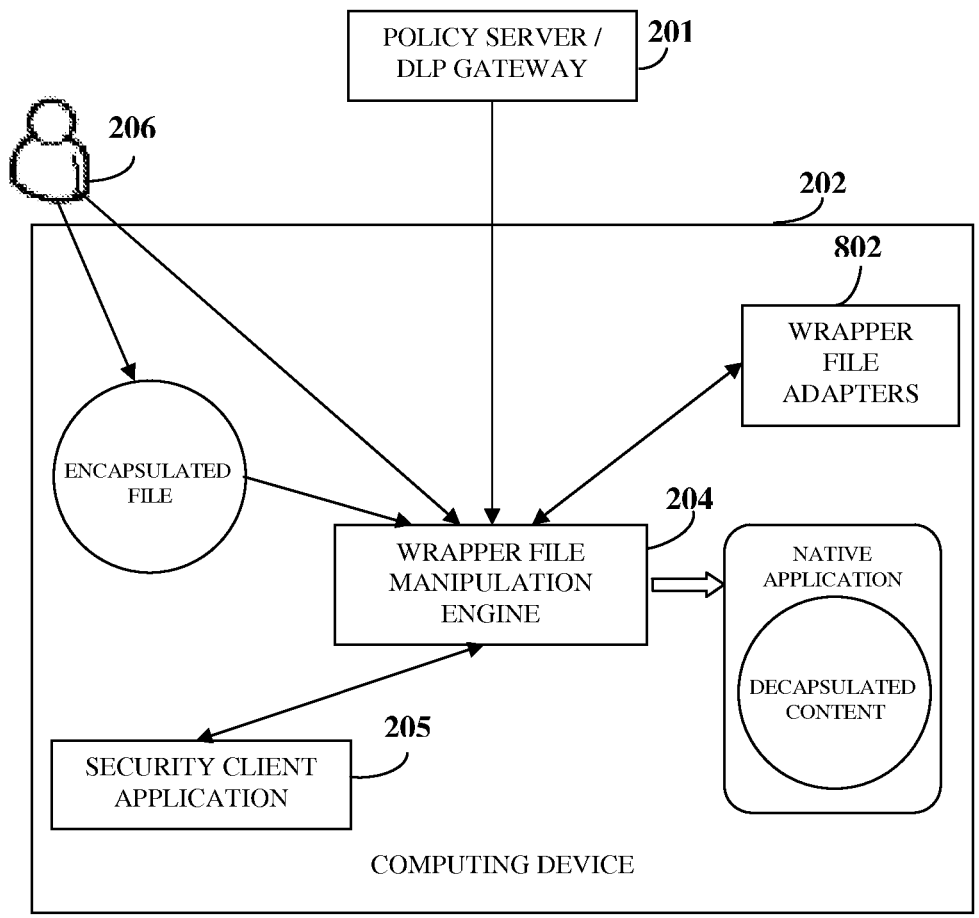
FIG. 8B exemplarily illustrates the logical architecture for decapsulating a proprietary wrapper file.

FIG. 8B exemplarily illustrates the logical architecture for decapsulating a proprietary wrapper file. When the user 206 attempts to access the encapsulated electronic content, the wrapper file manipulation engine 204 is launched. The wrapper file manipulation engine 204 reads the file header of the wrapper file and determines the access or authentication mode. The wrapper file manipulation engine 204 prompts the user 206 to enter the user credentials, which are communicated to the policy server 201 or DLP gateway for user authentication. The decryption key(s) for decrypting the electronic content are obtained based on the access mode. The wrapper file manipulation engine 204 invokes one or more wrapper file adapters 802 with the metadata for carrying out the intended functionalities. The decapsulated electronic content is opened with the native application, and the user 206 is allowed controlled access to the electronic content by enforcing the content usage policies.

Figure 9:
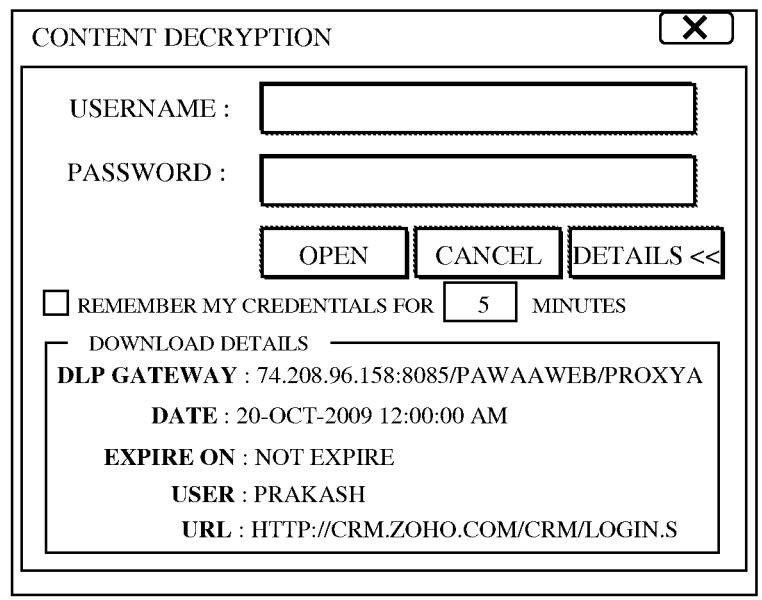
FIG. 9 exemplarily illustrates a screenshot of a user authentication window for decrypting and opening the electronic content.

In order to authenticate the user 206 in the explicit authentication mode, the user 206 is shown an authentication window. FIG. 9 exemplarily illustrates a screenshot of a user authentication window for authenticating the user 206 and decrypting the electronic content. The user 206 enters the credentials, for example, username and password in the authentication window. The user credentials are validated either by the wrapper file manipulation engine 204 against the information stored in the file header of the wrapper file. Alternatively, the user credentials are validated by the policy server 201. If the user credentials are invalid, a message is displayed to the user 206 to enter the correct user credentials. If the user credentials are valid, the electronic content is decrypted using the appropriate decryption key available from the file header or the policy server 201.

The security client application 205 allows or denies predefined user activities in accordance with the content usage policy extracted from the file header. The user activities are collated in the activity log for a period of time, and this user behavior inferred in the activity log is transferred to the policy server 201. When the user 206 terminates the application to close the electronic content, the electronic content is re-encrypted. In case where the user 206 has created a copy of the electronic content, the copy is encrypted using the same encryption key stored in the file header of the wrapper file. The copy is also encapsulated within a wrapper file as described in the description of FIG. 8A.

FIG. 10 exemplarily illustrates a screenshot enumerating the content usage policies associated with the electronic content. The content usage policies are stored in the file header of the wrapper file and comprise either a default set of policies established by the administrator or tailor made policies to direct and achieve intended behavior of a particular user 206, or a group of users associated with an enterprise with respect to the electronic content.

Consider an example, where a business analyst Jane working in a corporate enterprise wishes to download a requirements document from an internal website. Jane launches Internet Explorer of Microsoft® Inc. on her computing device 202 connected to the enterprise network 208 and navigates to the internal project files on the website. Jane then clicks a link to download the requirements document to the computing device 202. The policy server 201, associated with the online resources 207 where the requirements document is located, is invoked after detecting Jane's request to download the requirements document. The policy server 201 prompts Jane to download a portable utility, for example, the wrapper file manipulation engine 204 along with the requirements document. When Jane accepts the prompt, the wrapper file manipulation engine 204 is downloaded to the computing device 202, following which the requirements document is downloaded and encapsulated by the proprietary wrapper file in an encrypted format. The wrapper file carries a uniform file extension and is assigned a file icon that is representative of the corporate logo of Jane's enterprise. Jane then attempts to open the electronic content by double clicking the wrapper file, which prompts Jane to download and install the security client application 205 from a predefined URL. After installing the security client application 205, the wrapper file immediately invokes an authentication window to authenticate Jane at the policy server 201. Jane, being an authorized employee of the enterprise, enters a pre-negotiated username, for example, an employee identifier (ID), and a password. The credentials for accessing the requirements document are validated at the policy server 201 based on a distribution list for the requirements document. The requirements document is opened using the native application for the document according to the header records of the wrapper file. Jane then obtains controlled access to the requirements document based on the content usage policies associated with the document, during which Jane's activities on the document are monitored, controlled, and logged.

At a later time, Jane receives an electronic mail (e-mail) from an authorized associate. Jane opens Outlook Express of Microsoft® Inc. to preview the e-mail and finds an attachment with the e-mail. Jane attempts to download the attachment to the computing device 202, which is detected by the security client application 205 installed on the computing device 202. The security client application 205 recognizes that the attachment has the extension of the wrapper file, and that the attachment has already been encrypted by the wrapper file. The security client application 205 permits Outlook Express to directly download the attachment to the "downloads" folder of the computing device 202, without redundantly re-encapsulating the attachment in an encrypted format. Jane authenticates her credentials using her employee ID and password and obtains controlled access to the downloaded attachment.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Python, or JAVA. The software programs may be stored on or in one or more mediums as an object code. A computer program product comprising computer executable instructions embodied in a computer readable medium comprises computer parsable codes for the implementation of the processes of various embodiments.

Where databases are described such as the policy database 201*a* and the logging database 201*b*, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method of managing security of and access to an electronic content in a networked environment, comprises of: creating a proprietary wrapper file that encapsulates an electronic content upon transferring said electronic content to a computing device of a user by invoking a wrapper file manipulation engine in response to a user action, and wherein said proprietary wrapper file is configured for enforcing content usage policies on said electronic content and for performing a plurality of configurable functionalities, and wherein a format of said proprietary wrapper file indicates an encryption of said electronic content encapsulated within said proprietary wrapper file, wherein said format of said proprietary wrapper file is a proprietary content security format, and wherein said electronic content is encapsulated within said proprietary wrapper file regardless of a native file format of an electronic file, and based on a confidentiality level assigned to said electronic content; providing a security client application on said computing device in response to a request for accessing said electronic content, and wherein said proprietary wrapper file carries a proprietary and uniform file extension regardless and independent of a native file format, file type and file extension of said encapsulated electronic content or an internet media type of said electronic content, and wherein said proprietary wrapper file is assigned with a customized file identifier, and wherein said customized file identifier is a customized file icon that identifies a source or creator or owner of said electronic content;

embedding a local software component within said security client application employed for accessing said networked environment, and wherein said local software component is preloaded on said computing device of said user;

granting a controlled access to said electronic content to said user by enforcing said content usage policies by said security client application through said proprietary wrapper file;

monitoring and tracking activities of said user on said electronic content by said security client application to ensure compliance of said activities with said enforced content usage policies; and restricting said user from performing predefined activities on said electronic content on detection of violations of said enforced content usage policies;

the wrapper file comprises a file header, which comprises a header records that implements life cycle management, so when a user tries to access an encapsulated electronic content in a wrapper file, the wrapper file will expires or erases or locks the electronic content after a predetermined number of attempts.

2. The computer implemented method of claim 1, wherein said content usage policies are stored in a file header contained within said proprietary wrapper file, and wherein said content usage policy is pre-established and populated in said file header or said content usage policy is assembled on the fly and populated in said file header of said proprietary wrapper file during a content transfer, and wherein said proprietary wrapper file encapsulates said electronic content, said file header and said content usage policies in an encrypted format.

3. The computer implemented method of claim 1, wherein said proprietary wrapper file encapsulates and encrypts said electronic content upon transferring said electronic content to said computing device, and wherein said proprietary wrapper file encapsulates said electronic content in a multi-layer encrypted format along with a metadata that describes said electronic content, an enforceable content usage policy information and a plurality of configurable functionalities.

4. The computer implemented method of claim 1, wherein said wrapper file manipulation engine authenticates said user when required by said content usage policy and decrypts said encapsulated electronic content for granting said controlled access to said electronic content encapsulated within said proprietary wrapper file.

5. The computer implemented method of claim 4, wherein said wrapper file manipulation engine launches a pre-designated native application to grant said controlled access to said electronic content according to said content usage policy.

6. The computer implemented method of claim 1, wherein said proprietary wrapper file comprises a plurality of records in a predefined format, said records pertaining to said electronic content, said content usage polices, type and format of said electronic content, and identification and addressing of said policy server and a source of said electronic content.

7. The computer implemented method of claim 1, wherein said proprietary wrapper file is configured to synchronize and automatically update said encapsulated electronic content with a source copy of said electronic content in a networked environment based on said content usage policy.

8. The computer implemented method of claim 1, wherein said proprietary wrapper file is configured to execute embedded files and applications, and wherein said files and applications are embedded in said encapsulated electronic content.

9. The computer implemented method of claim 1, wherein said proprietary wrapper file is configured to launch external Applications on one of said computing device and said networked environment for executing said embedded files and applications, and wherein said files and applications are embedded in said encapsulated electronic content.

10. A computer implemented method of creating a proprietary wrapper file for encapsulating an electronic content in a networked environment, comprises:

invoking a wrapper file manipulation engine in response to a user action to trigger an encapsulation of an electronic content within a proprietary wrapper file, and wherein said proprietary wrapper file comprises a predefined file structure;

obtaining a content usage policy and an encryption information from a policy server based on a user information in response to invoking said wrapper file manipulation engine;

generating a metadata associated with one or more configurable functionalities by invoking one or more wrapper file adapters associated with said one or more configurable functionalities; and encapsulating and selectively encrypting one or more of said electronic content, said user in formation, said usage policy, said encryption information, and said generated metadata in said predefined file structure of said proprietary wrapper file;

the wrapper file comprises a file header, which comprises a header records that implements life cycle management, so when a user tries to access an encapsulated electronic content in a wrapper file, the wrapper file will expires or erases or locks the electronic content after a predetermined number of attempts.

11. The computer implemented method of claim 10, wherein said user action that triggers encapsulation of said electronic content comprises at least one of an explicit request to encapsulate said electronic content stored on a computing device of said user and a request to transfer said electronic content to a computing device of said user from said networked environment.

12. A computer implemented system for managing security of and access to an electronic content in a networked environment, comprising:

a policy server that provides a security client application on a computing device of a user in response to a request for accessing an electronic content within a networked environment;

a wrapper file manipulation engine provided on said computing device that creates a proprietary wrapper file for encapsulating said electronic content, said wrapper file manipulation engine configured to encapsulate said electronic content based on a confidentiality level assigned to said electronic content, said proprietary wrapper file configured to be assigned with a customized file identifier, said customized file identifier being a customized file icon identifying a source/creator/owner of said electronic content, and wherein said proprietary wrapper file is configured for enforcing content usage policies on said electronic content and for performing a plurality of configurable functionalities;

a plurality of wrapper file adapters distributed over said networked environment that generate a metadata associated with said configurable functionalities, and wherein said metadata is encapsulated along with said electronic content within said proprietary wrapper file when said wrapper file manipulation engine invokes one or more of said wrapper file adapters, and wherein said wrapper file manipulation engine has a plug-in architecture to allow said one or more wrapper file adapters to be implemented and registered with said wrapper file manipulation engine that invokes said wrapper file adapters to provide an intended configurable functionalities;

wherein said security client application that embeds a local software component employed for accessing said electronic content within said security client application, and wherein said security client application comprising:

an access control module that grants a controlled access to said electronic content to said user by enforcing said content usage policies through said proprietary wrapper file; and an activity tracking module that monitors and tracks activities of said user on said electronic content to ensure compliance of said activities with said enforced content usage policies;

the wrapper file comprises a file header, which comprises a header records that implements life cycle management, so when a user tries to access an encapsulated electronic content in a wrapper file, the wrapper file will expires or erases or locks the electronic content after a predetermined number of attempts.

13. The computer implemented system of claim 12, wherein said access control module restricts said user from performing predefined activities on said electronic content on detection of violations of said enforced content usage policies.

14. The computer implemented system of claim 12, wherein said content usage policies are stored in a file header contained within said proprietary wrapper file.

15. The computer implemented system of claim 12, wherein said wrapper file manipulation engine encapsulates said electronic content within said proprietary wrapper file and encrypts said electronic content upon transferring said electronic content to said computing device.

16. The computer implemented system of claim 12, wherein said wrapper file manipulation engine assigns a unique file identifier to said proprietary wrapper file based on a source of said electronic content.

17. The computer implemented system of claim 12, wherein said access control module authenticates said user using said proprietary wrapper file and decrypts said electronic content for granting said controlled access to said electronic content encapsulated within said proprietary wrapper file.

18. The computer implemented system of claim 13, wherein said proprietary wrapper file comprises multiple records in a predefined format, said records pertaining to said content usage polices, said electronic content, type and format of said electronic content, and identification and addressing of said policy server and a source of said electronic content.

19. The computer implemented system of claim 13, wherein said proprietary wrapper file is configured to synchronize and automatically update said encapsulated electronic content with a source copy of said electronic content in said networked environment.

20. The computer implemented system of claim 13, wherein said proprietary wrapper file is configured to execute embedded files and applications, and wherein said files and applications are embedded in said encapsulated electronic content.

21. The computer implemented system of claim 13, wherein said proprietary wrapper file is configured to launch external applications on one of said computing device and said networked environment for executing embedded files and applications.

22. A non-transitory computer-readable medium storing a program causing a computer to execute a computer implemented method for managing security of and access to an electronic content in a networked environment, said program comprising:

a first computer parsable program code for creating a proprietary wrapper file for encapsulating an electronic content within said proprietary wrapper file upon transferring said electronic content to a computing device of a user, and wherein said proprietary wrapper file is configured for enforcing content usage policies on said electronic content and for performing a plurality of configurable functionalities, said proprietary wrapper file further configured to encapsulate said electronic content based on a confidentiality level assigned to said electronic content, said proprietary wrapper file configured to be assigned with a customized file identifier, said customized file identifier being a customized file icon identifying a source/creator/owner of said electronic content;

a second computer parsable program code for providing a security client application on said computing device;

a third computer parsable program code for embedding a local software component within said security client application, and wherein said local software component is preloaded on said computing device;

a fourth computer parsable program code for granting the user controlled access to said electronic content by enforcing said content usage policies;

a fifth computer parsable program code for monitoring and tracking activities of said user on said electronic content to ensure compliance of said activities with said enforced content usage policies;

a sixth Computer parsable program code for restricting said user from performing predefined activities on said electronic content on detection of violations of said enforced content usage policies;

a seventh computer parsable program code for assigning a unique file identifier to said proprietary wrapper file based on a source of said electronic content;

an eighth computer parsable program code for synchronizing and automatically updating said encapsulated electronic content with a source copy of said electronic content in a networked environment;

a ninth computer parsable program code for executing embedded files and applications, and, wherein said files and applications are embedded in said encapsulated electronic content; and a tenth computer parsable program code for launching external applications on one of said computing device and said networked environment for executing embedded files and applications, and wherein said files and applications are embedded in said encapsulated electronic content;

the wrapper file comprises a file header, which comprises a header records that implements life cycle management, so when a user tries to access an encapsulated electronic content in a wrapper file, the wrapper file will expires or erases or locks the electronic content after a predetermined number of attempts.

23. The computer implemented method of claim 1, wherein said proprietary wrapper file is content-type agonistic, and wherein said proprietary wrapper file enables to encapsulate any type of electronic content irrespective of a type of said electronic content, and wherein a plurality of further electronic content types are amendable to protection by the encapsulation format of said proprietary wrapper file.

24. The computer implemented method of claim 1, wherein said proprietary wrapper file provides information rights management (IRM) aspects, time aspects, location aspects and environment control aspects in managing said electronic content security, and wherein said access to said electronic content is controlled based on pre-defined IRM policies, data loss prevention (DLP) policies, distribution lists, and location and environment restrictions.

25. The computer implemented method of claim 1, wherein said electronic content is transferred and accessed through a plurality of access modes, and wherein said plurality of access modes includes an explicit authentication mode, an implicit authentication mode and an off-line mode.

26. The computer implemented method of claim 5, wherein said wrapper file manipulation engine allows a user to run said pre-designated native application to access said electronic content to create new copies of said electronic content, and wherein said wrapper file manipulate engine triggers re-encryption of said new copies of said electronic content.

27. The computer implemented method of claim 5, wherein said wrapper file manipulation engine encrypts any copies of said electronic content created by said pre-designated native application into said proprietary wrapper files by replicating said policy information, said encryption/decryption key, and other records of said file header from said proprietary wrapper file.

28. The computer implemented method of claim 1 wherein said security client application tracks said activities performed by said user with said electronic content and creates an activity log, and wherein tracking said activities comprises capturing and recording user inputs, number of unsuccessful authentication attempts, editing operations on said electronic content, copy and paste operations on said electronic content, save as operations, print commands.

29. The computer implemented method of claim 1, wherein multiple wrapper file adapters are distributed over said networked environment adapted to generate said metadata associated with said configurable functionalities.

* * * * *